United States Patent [19]

Zosel

[11] 4,348,422
[45] Sep. 7, 1982

[54] PROCESS FOR THE DIRECT DECAFFEINATION OF AQUEOUS COFFEE EXTRACT SOLUTIONS

[75] Inventor: Kurt Zosel, Oberhausen, Fed. Rep. of Germany

[73] Assignee: Studiengesellschaft Kohle m.b.H., Kaiser-Wilhelm-Platz, Fed. Rep. of Germany

[21] Appl. No.: 906,882

[22] Filed: May 17, 1978

Related U.S. Application Data

[63] Continuation-in-part of Ser. No. 877,535, Feb. 13, 1978, abandoned.

[51] Int. Cl.$^3$ ............................................. A23F 5/22
[52] U.S. Cl. ................................. 426/475; 426/427; 426/478
[58] Field of Search ............... 426/427, 475, 478, 481

[56] References Cited

U.S. PATENT DOCUMENTS

3,806,619  4/1974  Zosel ............................. 426/427 X
3,843,824 10/1974  Roselius et al. ............... 426/427 X
3,879,569  4/1975  Vetzhum ......................... 426/427
3,969,196  7/1976  Zosel ............................. 203/49

FOREIGN PATENT DOCUMENTS

2005293 11/1972 Fed. Rep. of Germany .
1057911  2/1967 United Kingdom .

OTHER PUBLICATIONS

Swetz, Coffee Processing Technology, 1963, vol. II, The Avi Publ. Co.; Westport, Conn., p. 214.

Primary Examiner—Joseph M. Golian
Attorney, Agent, or Firm—Sprung, Horn, Kramer & Woods

[57] ABSTRACT

A process for the direct decaffeination of aqueous coffee extract solutions by contacting the surface of a thin film of an aqueous coffee extract solution with carbon dioxide under supercritical conditions of temperature and pressure to thereby remove the caffeine into the $CO_2$ and directly recover the aqueous coffee extract solution substantially free from caffeine. The contacting of the aqueous coffee extract solution and the $CO_2$ is preferably effected by passing the aqueous coffee extract solution downwardly through a packed column, while passing the $CO_2$ upwardly in countercurrent contact therewith.

16 Claims, 1 Drawing Figure

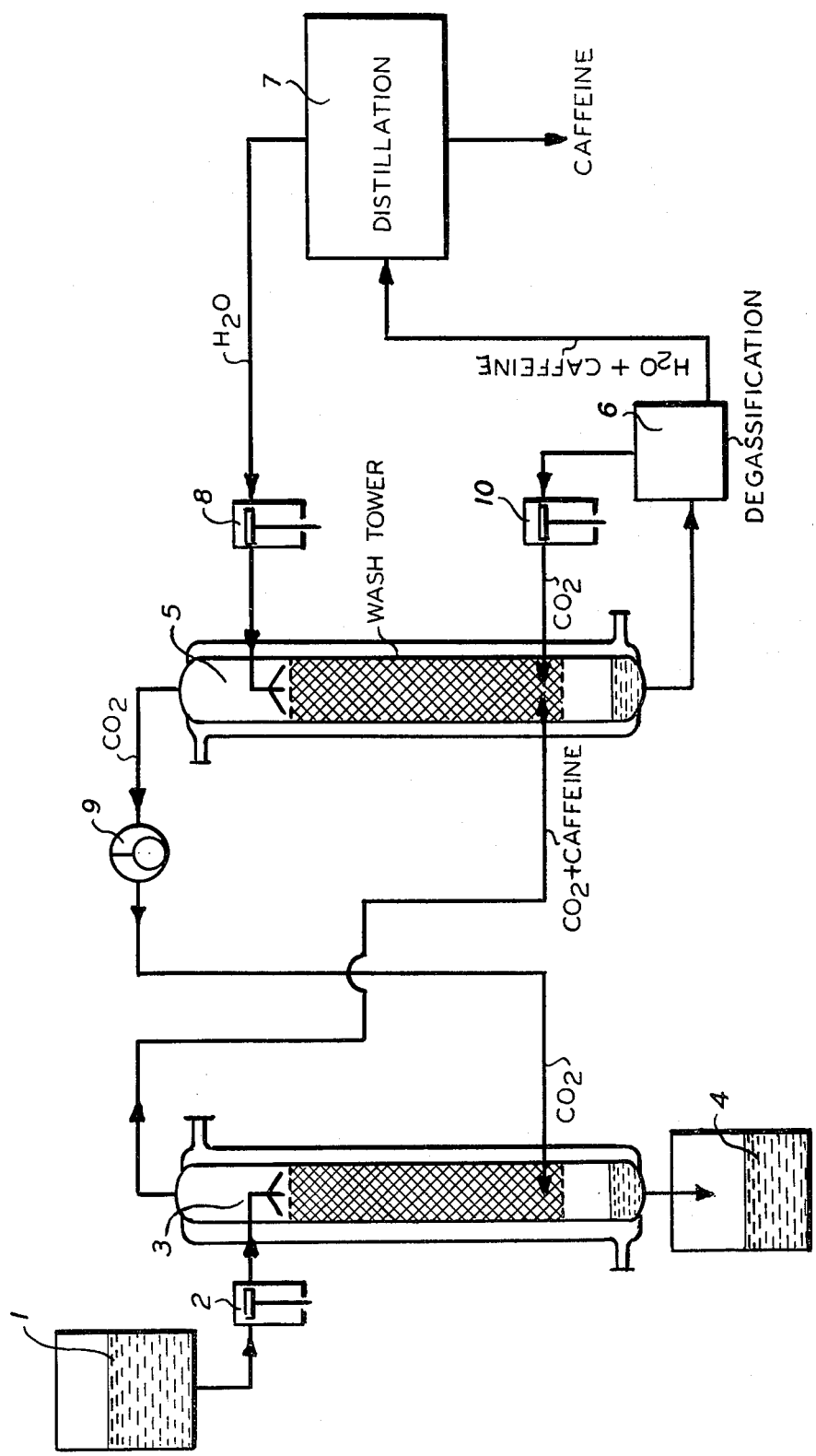

PROCESS FOR THE DIRECT DECAFFEINATION OF AQUEOUS COFFEE EXTRACT SOLUTIONS

This invention relates to, and has as its object a process for the direct decaffeination of aqueous coffee extract solutions, and is a continuation-in-part of my co-pending application Ser. No. 877,535, filed Feb. 13, 1978 now abandoned.

In my co-pending application Ser. No. 364,190, filed May 25, 1973, I have described a process for the removal of caffeine from coffee by contacting the coffee solids, either in the form of beans or ground coffee, with moist $CO_2$ under conditions of supercritical temperature and pressure. While this process effectively removes the caffeine from the coffee without the possibility of contamination of the coffee with undesirable extraction solvents or the likes, the process requires the handling of the solid coffee product and often requires a treatment time measured in hours for a substantially complete caffeine removal.

If the treatment is effected on roasted coffee, as opposed to green coffee, coffee oils containing the aroma and flavor constituents are removed in addition to the caffeine. Therefore, if the process is to be effected on roasted coffee, it is generally necessary to first selectively remove the aroma and flavor constituents and to replace the same after the caffeine removal.

Attempts have also been made to utilize supercritical $CO_2$ to remove caffeine from aqueous coffee extract solutions as, for example, are utilized in making soluble coffee. In accordance with such proposals, aroma and flavor constituents are first removed; the aqueous extract without these constituents is then contacted with the carbon dioxide for the removal of the caffeine, and thereafter the aroma and flavor constituents are replaced. The caffeine removal is, however, neither effective nor efficient, as foaming occurs, which interferes with the efficient caffeine removal and requires prolonged treating periods.

One object of this invention is the direct, selective removal of caffeine from aqueous coffee extract solutions without the prior art problems and without the requirement of an initial removal of aroma and flavor constituents.

This and still further objects will become apparent from the following description read in conjunction with the drawing, which is a flow sheet showing a preferred embodiment of the invention.

In accordance with the instant invention, I have now surprisingly discovered that caffeine can be substantially completely removed from coffee in a greatly simplified manner, in a much shorter period of time and without the requirement of prior removal of aroma and flavor constituents, by contacting the surface of a thin film of an aqueous coffee extract solution with $CO_2$ under supercritical conditions of temperature and pressure. This directly, effective removes caffeine from the aqueous coffee extract, carrying the same off in the carbon dioxide fluid phase, from which the same may be recovered.

The aqueous coffee extract solution which is utilized in accordance with the invention may be any conventional aqueous coffee extract solution, such as, for example, is generally obtained by brewing coffee, or in a process for making soluble, solid coffee extract known in the art as instant coffee. The aqueous coffee extract is, thus, generally formed by contacting ground coffee beans with hot or boiling water and in general contains about 20 to 40, and preferably 25 to 38, percent by weight of dissolved coffee solids, the caffeine content of which may amount to about 3 to 6, and generally 4 to 5, weight percent. The aqueous coffee extract solution treated in accordance with the invention may also be concentrated by removal of a portion of the water content, up to the point of saturation with the dissolved coffee solids. The aqueous coffee extract solution can also be prepared from roasted, ground coffee which has been treated with dry carbon dioxide to remove the coffee oil and certain aroma and flavor components as described in U.S. Pat. No. 3,969,196 or German Pat. No. 2,119,678. After decaffeination, it is then, of course, necessary to replace the aroma and flavor components. It is therefore preferable to use "whole" aqueous coffee extract from which the aroma and flavor components have not been removed.

The carbon dioxide may be used as such or may contain an amount of water up to the amount which will saturate the same under the particular conditions of temperature and pressure that the same is used, and is generally so saturated when recycled in accordance with the process of this invention.

The supercritical conditions of temperature and pressure under which the contacting is effected may range from temperatures between 32° C. and 140° C., and preferably between 40° C. and 80° C., and pressures between 75 atm and 350 atm, and preferably 150 atm and 250 atm.

The carbon dioxide must contact the surface of a thin film of the aqueous coffee extract solution, as opposed to being passed through a liquid body of the aqueous coffee extract solution. The aqueous coffee extract solution may be converted into the form of a thin film for the surface contact with the carbon dioxide in any known or desired manner, as for example, by passing the aqueous coffee extract solution over a surface in the form a thin film covering the same; by passing the aqueous coffee extract solution through a cascade or similar device which converts the same into a free, thin film of large surface area; with the use of apparatuses which correspond to thin film surface evaporators, or the like. It has been found preferable to pass the aqueous coffee extract solution downwardly through a packed column containing filling bodies as known in the chemical art, and to pass carbon dioxide upwardly through the column in countercurrent contact with the aqueous coffee extract solution.

In general, amounts of carbon dioxide between 10 g and 100 g, and preferably 30 g and 40 g, per cc of aqueous coffee extract should be used. It is very simple to empirically determine relative amounts of the $CO_2$ and aqueous coffee extract solution streams for maximum speed, efficiency and caffeine removal. The aqueous coffee extract, after the contacting with the $CO_2$, is substantially free of the caffeine, generally being freed of at least 97 to more than 98 percent of its caffeine content. This aqueous coffee extract as recovered is directly suitable for consumption as decaffeinated coffee and may be concentrated by the conventional and known processes to produce solid, soluble, instant coffee, i.e., spray drying or freeze drying processes.

The carbon dioxide laden with the caffeine may be treated for the removal of caffeine in any known or conventional manner, as for example, by adsorption with activated charcoal, solvent extraction, or the like. Preferably, in accordance with the invention, carbon dioxide from the treatment, which is laden with caffeine and water, is first subject to a pressure release which drives off the carbon dioxide, leaving an aqueous solution of caffeine, from which the water and caffeine may be separated by distillation. Most preferably, the carbon dioxide laden with the caffeine is passed to a wash tower in the form of a filled column. A phase containing water and therein dissolved caffeine and carbon dioxide is removed from the bottom of this column, degassed by pressure release, releasing the carbon dioxide which is pressurized and passed to the bottom of the wash tower. The remaining water containing the caffeine is passed to a distillation operation in which the caffeine is removed and the water overhead recycled to the top of the wash column.

The degassification for the release of the carbon dioxide is effected at a pressure between 0.5 atm and 1 atm and a temperature preferably between 80° C. and 90° C. The carbon dioxide may be recycled to the wash tower, being pressurized to the same pressure existing in the wash tower. The water-and-caffeine is subjected to the distillation operation and the water removed by the distillation recycled to the wash tower, which is operated at a temperature between 32° C. and 140° C., and preferably 40° C. and 80° C., and pressure, and a pressure between 75 atm and 350 atm, and preferably 150 atm and 250 atm.

Referring to the embodiment shown in the accompanying drawing:

1 represents a tank for the aqueous coffee extract solution which is pumped by the pump 2 into the packed column 3, which is a packed column of conventional construction utilized in the chemical industry, containing, for example, filling bodies, such as Rashic rings, glassballs, stainless steel spirals, or the like. As the aqueous coffee extract solution passes downwardly over these filling bodies of the packed column, the liquid is converted to the form of a thin film with a large surface area. Carbon dioxide is pumped to the bottom of the column 3 under supercritical conditions of temperature and pressure and contacts the surface of the thin film of liquid extract formed on the filling bodies. The aqueous coffee extract solution freed of caffeine is recovered in the container 5. This caffeine-free, aqueous coffee extract may be conveyed to conventional freeze dry equipment, or the like, to produce instant, decaffeinated coffee. The carbon dioxide laden with water and caffeine is removed from the top of the column 3 and passed to the bottom of the wash tower 5 of conventional construction, which may be filled with filling bodies, such as Rashic rings, glass balls, stainless steel spirals, or the like. In the bottom of the wash tower, water and therein dissolved caffeine and carbon dioxide are passed to the degassification-pressure release chamber 6, in which the pressure is released and carbon dioxide is separated as gas from a liquid phase containing water and caffeine. The carbon dioxide is removed from the upper portion and pumped by the pump 10 back to the lower portion of the wash tower 5. The water containing the caffeine is passed to the distillation equipment 7, in which the water is distilled off from the caffeine, the caffeine being recovered, and the water pumped by the pump 8 back to the wash tower 5. The carbon dioxide is pumped from the upper part of the wash tower 5 by means of the pump 9 back to the bottom of the column 3.

The following Example is given by way of illustration and not limitation.

EXAMPLE

An apparatus as shown in the drawing is used. The aqueous coffee extract in the container 1 is produced in the conventional manner by brewing ground coffee beans with boiling water and contains 32 percent by weight of dissolved coffee solids with a caffeine content of 4.5%. The column 3 has a height of 6 m and a diameter of 6 cm, and is filled with glass balls of 1 cm diameter. The wash tower 5 has a height of 5 m, a diameter of 6 cm, and is filled with glass balls. The column 3 is maintained at a temperature between 50° C. and 51° C. and a pressure between 200 atm and 202 atm. The aqueous coffee extract solution (1) has a temperature of 50° C. and is pumped by the pump 2 into the top of the column 3, and carbon dioxide is pumped by the pump 9 into the bottom of the column 3, the same being maintained in the column at supercritical conditions of temperature and pressure by maintaining the pressure at 200 atm and the temperature at 50° C. Carbon dioxide passes upwardly through the column in countercurrent contact with the aqueous coffee extract solution passing downwardly over the filling bodies. The aqueous coffee extract is pumped into, and passes through the column at a rate of 17 cc or grams per minute, and the carbon dioxide passes upwardly through the column at a rate of 800 grams per minute. The carbon dioxide laden with water and caffeine is passed out from the top of the column 3 into the bottom of the wash tower 5, maintained at a temperature of about 50° C. The aqueous caffeine solution saturated with carbon dioxide is removed from the bottom of the wash tower into the pressure release chamber 6, which consists of a pressure vessel fitted with a heating device in which the pressure is relieved to a pressure of about 0.5 atm to 1 atm at a temperature of about 80° C. to 90° C., causing gaseous carbon dioxide to be released, which is pumped by the pump 10 to the bottom of the wash tower 5. Water containing the caffeine is separated as a liquid phase from the bottom of the chamber 6 and passed to the distillation apparatus. Substantially pure caffeine is separated and recovered as the water is distilled off and pumped by the pump 8 back to the tower 5 at a rate of about 80 cc per minute. Carbon dioxide is taken from the top of the wash tower 5 and recycled by the pump 9 back to the column 3. The treating time required to substantially decaffeinate the aqueous coffee extract solution recovered at 4 is less than 30 minutes. More than 98% of caffeine is removed.

In the example as described above, both columns 3 and 5 are held at 50° C. and the same pressure of 200 atm. If the temperature of column 3 is raised, for example, to 80° C. (the pressure being left unchanged at 200 atm), then the concentration of the coffee extract solution in column 3 increases during the decaffeination. In other words, water is transported from column 3 into column 5. Carbon dioxide is not inert to water, and in the supercritical condition it takes up more water at higher temperature than at lower temperature. This special effect associated with the water-$CO_2$ system can, thus, be utilized in the invention.

The invention has been described in detail with reference to a specific embodiment, and various changes and modifications may become apparent to the skilled artisan, which fall within the spirit of the invention and scope of the appended claims.

What is claimed is:

1. Process for the decaffeination of coffee, which comprises contacting the surface of a thin film of an aqueous coffee extract solution with carbon dioxide under supercritical conditions of temperature and pressure to thereby remove the caffeine, and recovering the aqueous coffee extract solution substantially free from caffeine.

2. Process according to claim 1, in which said aqueous coffee extract solution contains about 20 to 40 weight percent of dissolved coffee solids.

3. Process according to claim 2, in which said aqueous coffee extract solution contains about 25 to 38 percent dissolved coffee solids.

4. Process according to claim 1, in which said aqueous coffee extract solution is contacted with the carbon dioxide under supercritical conditions of a temperature of between about 32° C. and 140° C. and a pressure of between about 75 atm and 350 atm.

5. Process according to claim 1, in which said aqueous coffee extract solution is contacted with the carbon dioxide under supercritical conditions of a temperature of about 50° C. and a pressure of about 200 atm.

6. Process according to claim 1, in which said surface of a thin film of aqueous coffee extract solution is contacted with the $CO_2$ by passing the aqueous coffee extract solution downwardly through a packed column and by passing the $CO_2$ upwardly in countercurrent contact therewith.

7. Process according to claim 1, in which the caffeine is recovered after said contacting by separating the carbon dioxide from the phase formed containing carbon dioxide, water and caffeine, by pressure release, and recovering the caffeine from the remaining caffeine-water solution by distillation.

8. Process according to claim 7, in which the separated carbon dioxide is recycled for contacting with the aqueous coffee extract solution.

9. A process for the removal of caffeine from coffee, which comprises passing a stream of aqueous coffee extract solution downwardly through a packed column, passing a stream of carbon dioxide upwardly through said column in countercurrent contact with said aqueous coffee extract solution under supercritical conditions of temperature and pressure, removing decaffeinated, aqueous coffee extract solution from the lower end of the column, and removing a caffeine-laden, carbon dioxide containing phase from the upper portion of the column.

10. Process according to claim 9, which includes recycling the carbon dioxide to the lower portion of the column after separation from the caffeine.

11. Process according to claim 9, in which the caffeine-laden, carbon dioxide containing phase from the upper end of the column is subjected to pressure release to remove gaseous $CO_2$ therefrom, and the remaining water-caffeine phase is subjected to distillation for the separation of the water and caffeine.

12. Process according to claim 9, in which the caffeine-laden carbon dioxide from the upper portion of the column is passed to the lower end of a wash tower, the material from the end of the wash tower is subjected to pressure release, forming gaseous $CO_2$ which is recycled back to the lower portion of the wash tower, the remaining water-caffeine after the pressure release is subjected to distillation for the separation of water and caffeine, the caffeine removed, the water recycled to the upper end of the wash tower, and carbon dioxide from the upper end of the wash tower recycled to the lower end of the column.

13. Process according to claim 12, in which said contacting in the column is effected at a temperature between 32° C. and 140° C. and a pressure between 75 atm and 350 atm, and in which the wash tower is operated at a temperature between 32° C. and 140° C. and a pressure between 75 atm and 350 atm.

14. Process according to claim 12, in which said contacting in the column is effected at a temperature of about 50° C. and a pressure of about 200 atm, and in which the wash tower is operated at a temperature of about 50° C. and a pressure of about 200 atm.

15. Process according to claim 1, in which said aqueous coffee extract solution is a whole aqueous coffee extract solution containing aroma and flavor components.

16. Process according to claim 9, in which said aqueous coffee extract solution is a whole aqueous coffee extract solution containing aroma and flavor components.

* * * * *

UNITED STATES PATENT AND TRADEMARK OFFICE
CERTIFICATE OF CORRECTION

PATENT NO. : 4,348,422
DATED : Sep. 7, 1982
INVENTOR(S) : Kurt Zosel

It is certified that error appears in the above—identified patent and that said Letters Patent is hereby corrected as shown below:

Title Page      Delete "Kaiser-Wilhelm-Platz" and
Assignment      insert --Mülheim/Ruhr--.

Signed and Sealed this

Fifteenth Day of March 1983

[SEAL]

Attest:

GERALD J. MOSSINGHOFF

*Attesting Officer*     *Commissioner of Patents and Trademarks*